Nov. 11, 1924.

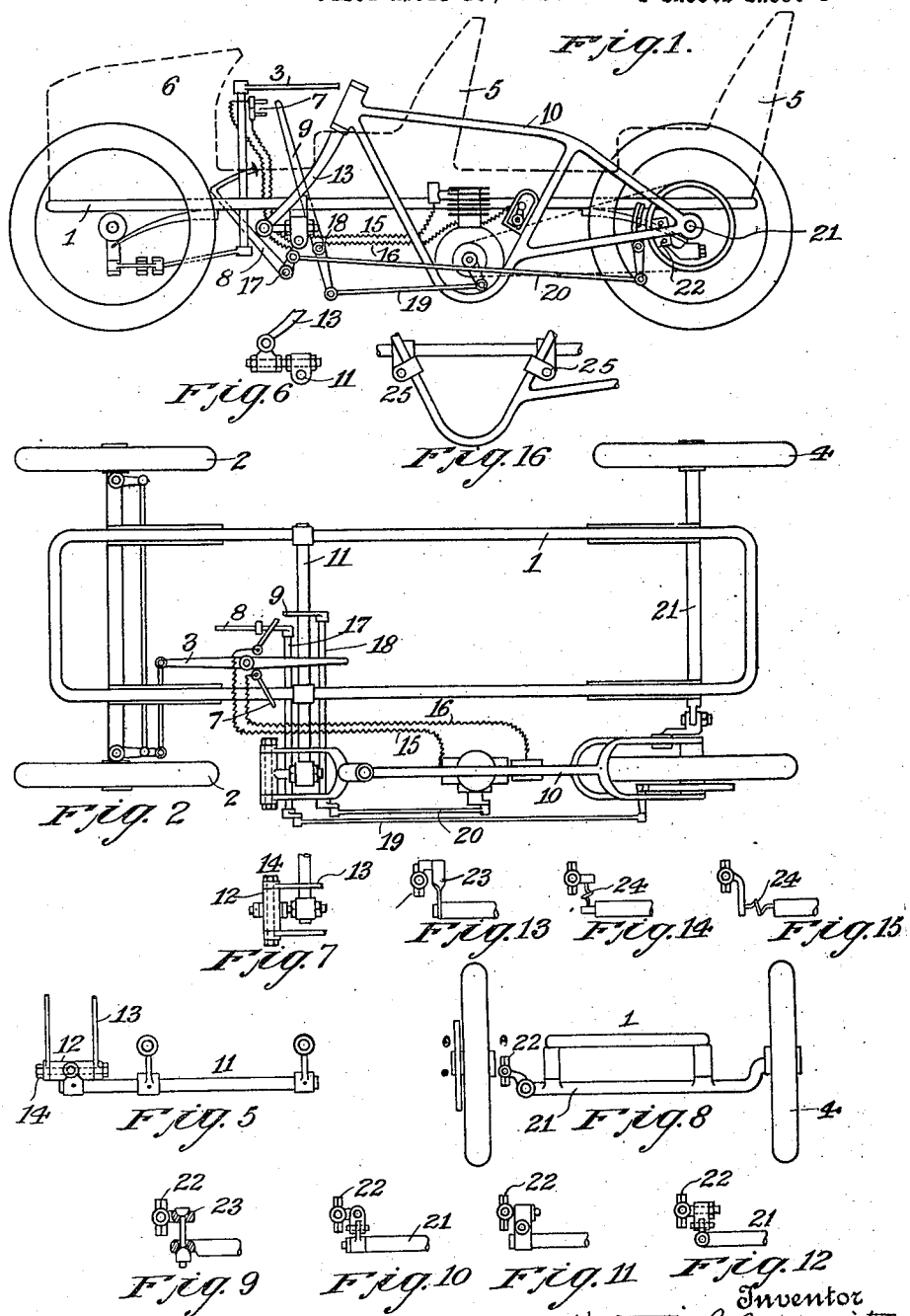

K. P. RADOVANOVITCH

AUTOVEHICLE

Filed April 18, 1922    2 Sheets-Sheet 2

Inventor
Konstantin P. Radovanovitch
By his Attorney
Parker W. Page

Patented Nov. 11, 1924.

1,515,363

UNITED STATES PATENT OFFICE.

KONSTANTIN P. RADOVANOVITCH, OF NEW YORK, N. Y.

AUTOVEHICLE.

Application filed April 18, 1922. Serial No. 554,415.

*To all whom it may concern:*

Be it known that I, KONSTANTIN P. RADOVANOVITCH, a citizen of the Republic of Switzerland, residing at New York, in the county and State of New York, have invented certain new and useful Improvements in Autovehicles, of which the following is a full, clear, and exact description.

The demand for automotive vehicles has led manufacturers to resort to endless expedients to simplify and reduce the cost of such vehicles in order to bring them within the reach of persons of moderate means, or in general to provide simple and inexpensive self-propelled machines for pleasure riding or business purposes in place of the larger and more expensive automobiles at present in use. The tendency in this direction has led to the building of motorcycles for one or two passengers or the construction of small attachments to motorcycles capable of carrying one or more persons, while the driver of the motorcycle using the seat of the latter operates it merely as the means of propelling the attached vehicle.

Recognizing the exceptional propelling power of the motorcycle and its general usefulness for many purposes, I have devised a motor vehicle which is more in the nature of an ordinary automobile, but for propelling which an ordinary motorcycle may be employed when so desired, and for this purpose I provide a two or three wheeled vehicle body with seats that may accommodate two or more persons, and with which a partly dismantled motorcycle may be united and combined as the propelling power.

In general terms my improved motor vehicle comprises a relatively small light body fashioned after the form and style of an ordinary car, but with one rear wheel or one rear and one front wheel absent. To render such device operative as a motor vehicle, the front wheel of a motorcycle is removed, the front fork attached to the said body, and the fork for the rear wheel properly connected to the rear axle of the car body, and provision made for operating the motorcycle and steering the vehicle from the front seat of the body of the car and not from the seat of the motorcycle, which may also be removed when the devices are assembled for use.

In this way I obtain what is virtually a three or a four-wheeled car, operated and controlled in the usual manner from its front seat, but which may be readily dismembered in case it be desired to use the motorcycle alone.

This improved vehicle is illustrated in the accompanying drawings, in which—

Fig. 1 is a side view in elevation of the combined body and motorcycle.

Fig. 2 is a top plan view of the frame of the same.

Figs. 5, 6 and 7 are detail views illustrating the means of attaching the front fork of a motorcycle to the frame of the car.

Figs. 8, 9, 10, 11 and 12 are detail views illustrating forms of joint between the motorcycle and the rear axle of the car body.

Figs. 13, 14 and 15 illustrate joints between the motorcycle and the rear axle of the car body which embody springs, and Fig. 16 illustrates a form of joint between the motorcycle frame and that of the car body.

Figure 3:
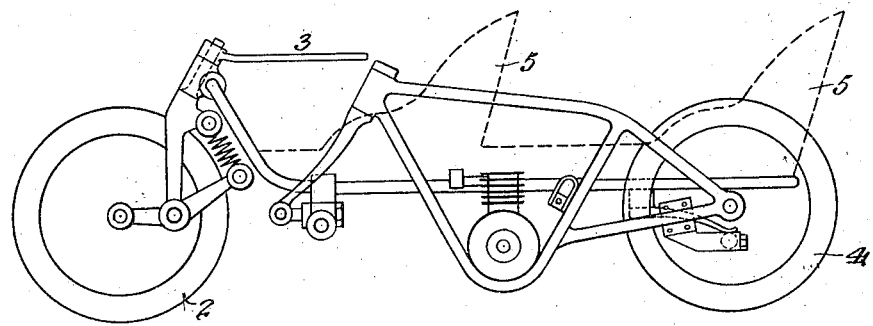
Fig. 3 is a side view of a modified form of the vehicle.
Figure 4:
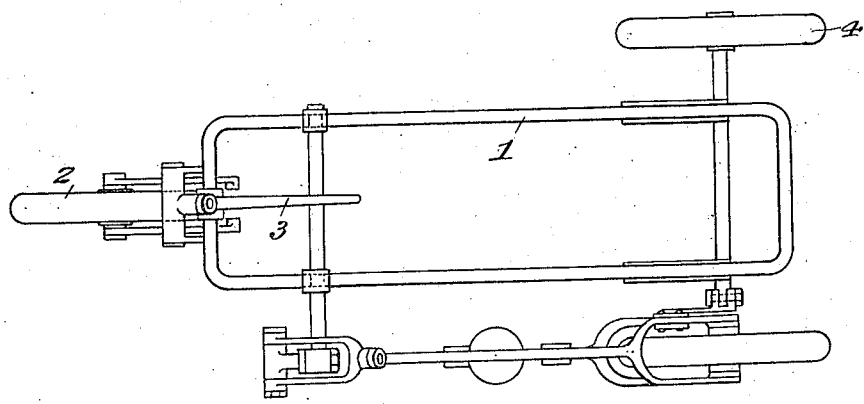
Fig. 4 is a top plan view of the frame of the machine shown in Fig. 3.

The car body is composed of a light frame 1, which, as shown in Fig. 2, may have two front wheels 2, with a steering device 3 connected therewith, and one rear wheel 4, or as shown in Fig. 4, one rear wheel 4 and a single front wheel 2, with a steering lever 3, therefor. In other words, the car body without other changes may be provided with either three or with only two wheels, as may be desired.

On the frame 1 are placed one or more seats 5, and if desired an imitation radiator, which may be simply a receptacle 6, and accessible from the front seat are the spark lever 7, the brake lever 8, the throttle lever 9, and any other device that may be required for the control and operation of the car. These parts are the only essential elements which are carried by or on the car body.

The propelling means for the car body is an ordinary motorcycle 10. When such a device is to be associated with the said body, its front wheel is removed, and its front fork is connected with the frame of the body in any suitable way. For this purpose a cross bar 11 is secured to the frame and extends out to one side for the proper distance, and to its end is secured a hollow member 12 which is secured to the front forks 13 by means of a pin with a nut 14, as shown in Figs. 5, 6 and 7, these figures being merely intended to represent any proper form of union or coupling.

After this connection is made the proper circuits 15 and 16 are connected up between the motorcycle and the car body, and the laterally extending rock shafts 17 and 18 between the levers 8 and 9, and the corresponding connecting rods 19 and 20 on the motorcycle are joined by any simple means. The means of control of the motorcycle are thus transferred from the latter to the car body.

The fork of the rear wheel of the motorcycle is so constructed or is provided with any suitable means by which it may be coupled with the rear axle of the car body. For example, the said axle 21 may carry any proper form of clamping plate 22, which may be secured by bolts to the rear fork of the motorcycle, and this plate may be pivotally connected to said axle as shown in Fig. 8, or the axle may be suspended from a part 23, carrying the plate as shown in Fig. 9, or connected with said plate in other ways as shown in Figs. 10, 11 and 12. By means of such connection the motorcycle is rigidly united to the car body and when operated drives the latter just as though its engine were built in as part of the car.

If springs be used between the car body and the rear axle, special provision must manifestly be made for the placing of said springs on the end of the axle to which the rear motorcycle wheel is attached. For this purpose the springs must be intermediate the axle and the point of connection with the rear fork of the motorcycle. This may be effected in any proper manner as by suspending the axle by a flexible connection 23 with the plate 21, as shown in Fig. 13, or by the use of any kind of spring 24, suitable for the purpose, as shown in Figs. 14 and 15.

If so desired, the motorcycle frame may be directly secured to that of the car body as by clamps 25 as shown in Fig. 16. In any case it is intended that when the two devices are associated, the motorcycle loses entirely its identity as a separate device and becomes merely the propelling mechanism for the car. As its seat, when it is so connected, becomes unserviceable, it is preferable to remove it.

Manifestly, the motorcycle as such is not impaired by its association with the car body, as nothing further is ever required but the removal of the front wheel, and the seat. If need be the front wheel could be carried as an extra and used in place of the rear wheel in case of need. The special nature of this device does not require the car body to be built of heavy or of as strong materials as an automobile body. It may be built very cheaply and made very light and still of sufficient strength to withstand all ordinary wear due to long and hard usage.

What I claim as my invention is—

1. A car body attachment for motorcycles comprising a light frame with seats, a single rear wheel at one side, front steering wheels and controlling mechanism therefor, in combination with means for connecting thereto as the propelling means a motorcycle with the front wheel removed, and means on said frame for controlling the operation of said connected motorcycle.

2. A car body attachment for motorcycles comprising a light frame with seats, with a single rear wheel at one side, front steering wheels and steering gear for controlling the same, in combination with means for connecting these to a motorcycle, as the propelling means, said motorcycle having its front wheel removed, in such relation that the rear motorcycle wheel takes the place of the missing rear wheel on the frame, and means accessible from a seat on said frame for controlling the operation of the engine of said connected motorcycle.

3. A car body attachment for motorcycles comprising a light frame with seats provided with a single rear wheel on one side only, front steering wheels and steering gear therefor, in combination with means for connecting to said frame the front fork of a motorcycle from which the wheel has been removed, means for connecting to said frame the rear fork of the motorcycle with its wheel in place, and means accessible from the front seat on the frame for controlling the operation of the engine of the motorcycle.

4. A motor vehicle comprising in combination, light framed car body with seats, front steering wheels and steering mechanism therefor, a rear wheel on one side only, a motorcycle having a rear wheel only connected to said car body by its frame so that its rear wheel takes the place of the missing rear wheel on the car body, controlling devices accessible from the front seat on the frame and electrical and mechanical connections between the same and the propelling mechanism on the motorcycle.

In testimony whereof I hereto affix my signature.

KONSTANTIN P. RADOVANOVITCH.